No. 698,349. Patented Apr. 22, 1902.
J. A. ANDERSON.
PLANTER.
(Application filed Aug. 27, 1901.)
(No Model.) 2 Sheets—Sheet 1.

WITNESSES:

INVENTOR
John A. Anderson
BY
ATTORNEYS

No. 698,349. Patented Apr. 22, 1902.
J. A. ANDERSON.
PLANTER.
(Application filed Aug. 27, 1901.)
(No Model.) 2 Sheets—Sheet 2.

WITNESSES:

INVENTOR
John A. Anderson
BY
ATTORNEYS

UNITED STATES PATENT OFFICE.

JOHN ALBERT ANDERSON, OF MUNSON, ILLINOIS.

PLANTER.

SPECIFICATION forming part of Letters Patent No. 698,349, dated April 22, 1902.

Application filed August 27, 1901. Serial No. 73,432. (No model.)

*To all whom it may concern:*

Be it known that I, JOHN ALBERT ANDERSON, a citizen of the United States, and a resident of Munson, in the county of Henry and State of Illinois, have invented a new and Improved Planter, of which the following is a full, clear, and exact description.

My invention relates to the planting or seed-dropping mechanism for planters; and the purpose of the invention is to so construct the seed-dropping device that it may be reversed or set as many times as is necessary in the field to plant from one to four kernels of corn in a hill without necessitating the operator dismounting from the machine.

A further purpose of the invention is to provide a planting device of the character mentioned which will be simple, durable, and readily manipulated, and which will not wear or strain upon the check-row wire, and which will plant in a straight line crosswise of the field, as the check-row only operates the plunger in the shoe.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
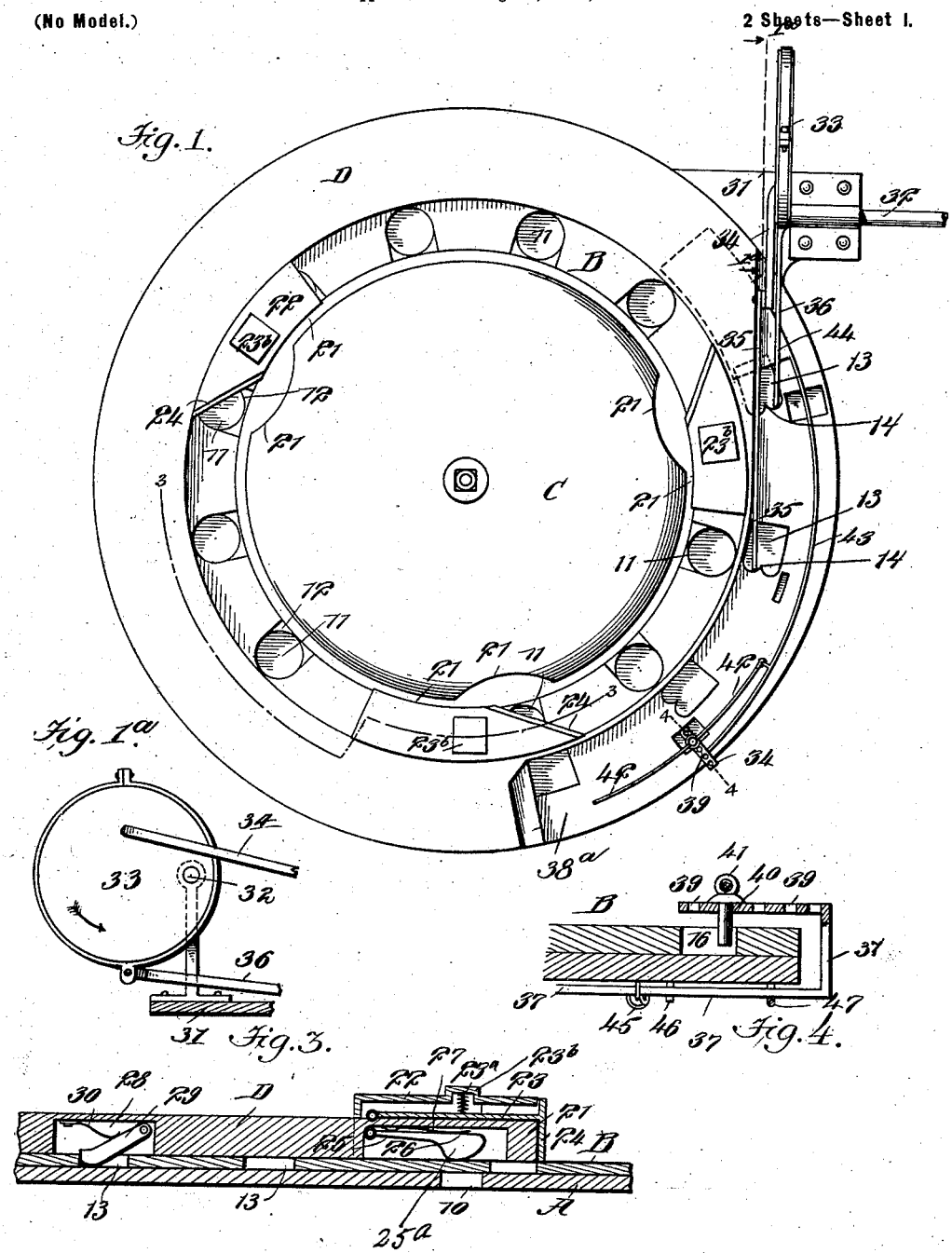
Figure 2:
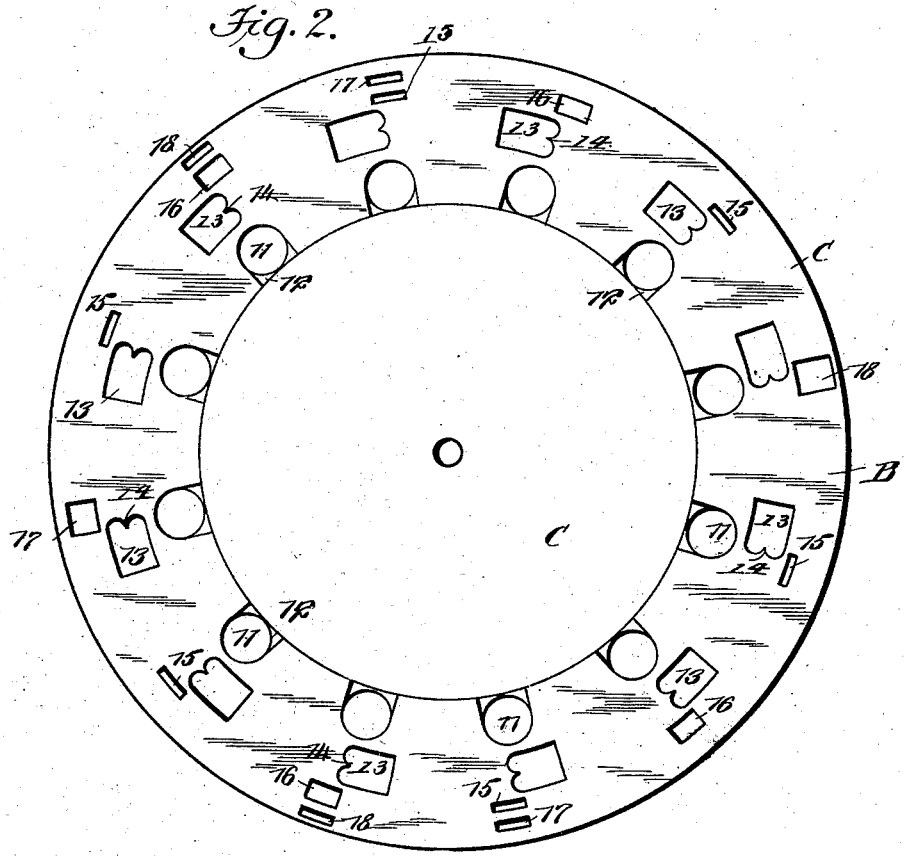
Figure 5:
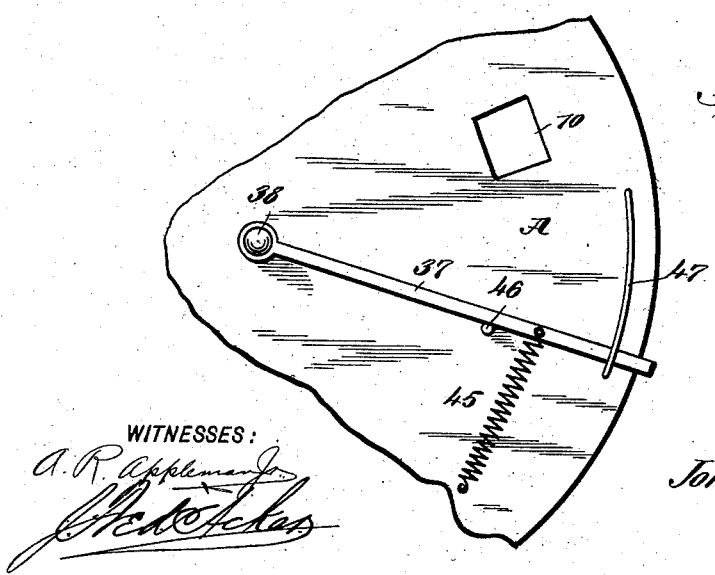

Figure 1 is a plan view of the planting attachment. Fig. 1ª is a section on line 1ª 1ª of Fig. 1. Fig. 2 is a plan view of the seed-carrying element and its pivotal connection with the base element. Fig. 3 is a section taken practically on the line 3 3 of Fig. 1. Fig. 4 is a section taken practically on the line 4 4 of Fig. 1, and Fig. 5 is a bottom plan view of that portion of the device at which the seed-outlet is placed.

In the construction of the device a base-plate A is employed, together with a seed-dropping plate B and an upper or housing ring D, which is secured at its peripheral portion to the base-plate A. The seed-dropping plate B is pivoted to the central portion of the base-plate by a suitable pivot-pin and a cap-washer C. The base-plate is provided with a seed-outlet 10 in its bottom, as is shown in Figs. 3 and 5, adapted to be connected in any suitable manner with a shoe or drop-tube of the ordinary construction.

Outside of the cap-washer C the seed-dropping plate B is provided with a series of circularly-arranged openings 11, each of which openings is adapted to receive a single kernel of corn or other grain, and, while not illustrated, a hopper adapted to receive the seed in bulk is attached to the housing-ring D, serving to direct the seed to the receiving-openings 11. In order to facilitate the seed entering the openings 11, the upper face of the seed-drop plate is beveled inward and downward to said openings through the cap-washer C, as is shown at 12 in Figs. 1 and 2. Outside the circle of seed-receiving openings 11 in the seed-drop plate B, which, as described, is mounted to revolve, elongated openings 13 are arranged in an annular series, an opening 13 being opposite each seed-receiving opening 11. The seed-receiving openings 11 are preferably circular, and the rear ends of the openings 13 are usually provided with a central division 14, and the said divided rear portions of the openings 13 may or may not be rearwardly and upwardly inclined to permit the return of dogs entering the openings 13 to give movement to the seed-dropping plate and the passage of a detent adapted to prevent backward movement of the seed-dropping plate, which detent and dogs will be hereinafter particularly described.

One purpose of this invention is to plant one, two, three, four, or more seeds in each hill, and to that end the seed-dropping plate B is provided outside of the openings 13 for the actuating-dogs with series of segmental slots 15, which slots are nearest the openings 13 and are at equal distances apart, being designed, in connection with an adjustable regulating device, to be hereinafter set forth, to cause a single kernel to be deposited in each hill, it being understood that each seed-receiving opening 11 is adapted to carry a single seed. Other slots 16 nearer the periphery are also provided in the said seed-dropping plate B, adapted in the movement of the seed-dropping plate actuated by the heretofore-mentioned dogs to drop two kernels of grain in each hill. These slots where they occur are usually combined with sundry of the first-named slots 15. A third series of slots 17, also in circular arrangement and nearer the periphery of the seed-dropping plate, are provided for dropping three kernels of grain in a hill. Of these slots 17 some are single and others are in common with the slots 15 and 16. A fourth series of slots 18 is provided at the periphery of the seed-dropping plate B, adapted to accomplish the dropping of four kernels in a hill. These outer series of slots 18 are in the main single; but at least one is combined with the slots 15, 16, and 17. This arrangement of slots is made in order that the regulating device may work equally well when a single seed is dropped in a hill as when four or more seeds are deposited.

In the revolution of the seed-dropping plate B each seed-carrying opening discharges its burden when it registers with the outlet 10, and it is very necessary that only a single seed shall be contained in each opening 11. To that end I form offsets 21 at the inner peripheral surface of the housing-ring D and place a cap 22 on each offset. Beneath each cap 22 the body portion 23 of a wiper is hinged at its inner end on the extensions or offsets, as is shown in Fig. 3, the blade 24 of the wiper being attached to the said body portion 23 in such manner that the blade will extend downward and diagonally over the path of the seed-receiving openings 11 and in contact with the upper face of the seed-dropping plate B, as is shown in Fig. 1. These wipers serve to remove all surplus seed from the said openings 11. The body portions 23 of the wipers are held downward by springs 23ª, bearing on them and against outward projections from the central portions of the caps 22, as is shown in Fig. 3. In Fig. 3 I have also represented a seed-discharge arm 25, located in a chamber 26 open at the bottom and produced in an offset 21. This arm is pivoted at its inner end and has a head 25ª, which through the medium of a tension-spring 27 bears upon the seed-dropping plate immediately over the discharge-opening 10 in the base-plate A, and when a receiving or seed-carrying opening 11 registers with the discharge-opening 10 the head 25ª of the arm 25 acts to force the seed from such opening 11. As the bottom of the head 25ª is convexed, it readily rides from the opening, where it has been acting as the seed-carrying plate is revolved. In order that the said carrying-plate shall have movement in one direction only, a detent or pawl 29 is employed, which detent is pivoted, as shown in Fig. 3, in a chamber 28, formed in the housing-ring D. The lower end of this detent is more or less curved, and said lower end of the detent is held in such position that it will enter the openings 13 in the seed-dropping plate as they present themselves, preventing the plate from moving rearward. The detent is held in its working position by a spring 30. The lower end of the detent being curved enables it to readily free itself from the opening 13, which it may have entered.

The seed-carrying disk is revolved in the following manner: A projection or extension 31 is carried from the base-plate A at its periphery, and a shaft 32 is mounted in bearings upon the extension, which shaft is driven from any suitable source of power generated by the machine. An eccentric 33 is mounted upon the inner end of this shaft, provided with the usual straps, and an arm 34 is projected from the eccentric in direction of the field of rotation of the seed dropping or receiving plate, as is shown in Fig. 1. A dog 35 is pivoted to this arm 34, which dog is of sufficient length to enter an advance feed-opening 13 and engage therewith at one side of the point 14, as is best shown in Fig. 1. A shorter dog 36 is attached to the eccentric-strap, extending in the same direction as the dog 35, the dog 36 being adapted to engage with a feed-opening 13 directly at the rear of the opening 13, with which the longer dog 35 engages; but the shorter dog 36 engages with the forward wall of the opening 13, in which it acts at the opposite side of the point 14 to the side engaged in the similar advanced opening by the dog 35, as is shown in Fig. 1.

The device for regulating the amount of seed to be dropped in a hill is shown in Figs. 1, 4, and 5, and is described as follows: An arm 37 is pivoted by a pin 38 at the central bottom portion of the base-plate A, which arm extends upward at the periphery of the base-plate in front of the eccentric 33 and is carried horizontally inward over that portion of the seed-dropping plate in which the feed openings or slots 13 are located. In order that the upper portion of the arm 37 may be thus located, a recess 38ª and having its forward end beveled is made in the housing-ring D, as is shown at the right in Fig. 1. The upper horizontal portion of the arm is provided with a series of apertures 39, usually four or more in number, and a pin 40 is passed down through any one of the apertures to enter the first, second, third, or fourth regulating-slots 15, 16, 17, and 18 in the seed-carrying plate. The pin 40 is provided at its upper end with an eye 41, through which the curved guide-rod 42 is passed, (see Fig. 1,) which guide-rod is a branch of and is hinged or pivoted to the curved main rod 43, carried in direction of the eccentric and attached to or made integral with a plate 44, which serves as a shield and in one position causes the forward feed-opening 13, or the opening nearest the eccentric, to be closed, so as to produce a pause in the rotation of the seed-carrying plate B, as the shorter dog 36 will then be prevented from acting at such time or while the longer dog 35 is being drawn rearward for another forward action. A spring 45 is attached at one end of the bottom member of the arm 37 and at a point on the base-plate A at or near the extension 31 of the said main-plate, so that when the regulating-pin 40 enters a regulating-slot in the seed-carrying plate B the shield 44 will be drawn forward and the spring 45 will be placed under tension. The shield, however, will not cover the feed-opening in which the shorter dog is adapted to enter until the desired number of seed-carrying openings or pockets 11 have registered with the outlet 10 or until the required number of seeds have been dropped in a hill. When this action takes place, the guide-rod 42 will engage with the forward beveled end of the recess 38ª in the housing-ring D, and the said rod by riding up upon the housing will carry the pin 40 out of engagement with the regulating-slot in which it may be entered, thus permitting the spring 45 to act to draw the shield 44 rearward to its normal position, permitting both dogs 35 and 36 to perform their functions. The arm 37 is limited in its rearward movement by a stop-pin 46, (shown in Fig. 5,) and the lower portion of the arm 37 is passed through a guide 47, located at the bottom portion of the base-plate, as is also shown in Fig. 5. When the pin 40 is placed in an inner slot 39, a single seed is dropped in a hill, as the pin will enter one of the regulating-slots 15. When the pin is placed in the second aperture 39 of the guide-arm 37, two seeds will be dropped in each hill and the pin will enter the regulating-slots 16. When the pin is placed in the third aperture 39, three kernels will be dropped in a hill and the pin will enter the single or double regulating-slots 17, and when four kernels are to be dropped in a hill the pin 40 is carried to the outermost aperture in the guide-arm 37, and the pin will then enter one of the outermost regulating-slots 18. The outside aperture 39 is so far removed from the seed-dropping disk or plate that when the pin 40 is placed in the outer aperture it will not be acted upon by the seed-dropping plate or disk, and the planter is thus converted into a drill.

Having thus described my invention, I claim as new and desire to secure by Letters Patent—

1. In a seed-planting attachment, a base-plate having an outlet for seed, a housing for the base-plate, a seed-dropping plate mounted to revolve between the base and housing, said seed-dropping plate having series of seed-carrying openings arranged to consecutively register with the outlet of the base-plate, and a mechanism for controlling the registry of the seed-dropping openings with the outlet in the base-plate to effect the delivery of seed, substantially as described.

2. In a seed-planting attachment, a base-plate having an outlet for seed, a housing attached to the base-plate and a seed-dropping plate mounted to turn between the housing and the base-plate, the said seed-dropping plate having series of seed-carrying openings arranged for registry with the seed-outlet together with a series of feed-openings opposite the seed-carrying openings, said seed-carrying plate being also provided with concentric series of regulating-openings, a pin adjustable to any regulating-opening of the series, a spring-controlled support for the pin, a trip for the pin operated by contact with a point on the housing, dogs arranged to enter the feed-openings, and a rotary actuating device for the dogs, substantially as described.

3. In a seed-planting attachment, a base-plate having an outlet for seed, a housing attached to the base-plate, and a seed-dropping plate mounted to turn between the housing and the base-plate, said seed-dropping plate having series of seed-carrying openings arranged for registry with the seed-outlet, together with a series of feed-openings opposite the seed-carrying openings, the forward ends of the feed-openings being in two divisions separated by a central partition, the said seed-carrying plate being also provided with a concentric series of regulating-openings outside of the feed-openings, a spring-controlled arm pivotally attached to the base-plate, which arm is carried up over the periphery of the base and the seed-carrying plate and over the top of the latter, the upper portion of the said spring-controlled arm being provided with a series of apertures, a pin adapted to enter any one of the said apertures and any one of the regulating-openings in the said series, a member attached to the apertured portion of the said arm and extending within the recessed portion of the housing, a shield located at the outer end of the said member, which shield is capable of covering sundry of the feed-openings, a guide-bar pivotally attached to the member carrying the shield, which guide-bar is passed through a suitable opening in the said pin, a shaft journaled in a support from the base-plate, and dogs differing in length actuated from the said shaft, which dogs are adapted to enter the feed-openings in the seed-dropping plate, one at each side of the partition at the forward ends of the said openings, as and for the purpose described.

4. In a seed-planting attachment, a base-plate, a ring-housing for the said base-plate attached thereto, said housing having an extension at its periphery, a seed-dropping plate mounted to revolve between the base-plate and the housing, the seed-dropping plate being provided with a circularly-arranged series of seed-receiving openings, a cap on the extension of the ring-housing, and a hinged wiper arranged beneath the cap, said wiper having its blade extending downwardly and diagonally of the seed-dropping plate and in the path of the seed-receiving openings as the said seed-dropping plate is revolved, substantially as described.

5. In a seed-planting attachment, a base-plate, a ring-housing for the said base-plate attached thereto, said housing having offsets at its periphery, a seed-dropping plate mounted to revolve between the base-plate and the housing, the seed-dropping plate being provided with a circularly-arranged series of seed-receiving openings, a cap on each of the extensions of the ring-housing, pivoted wipers carried by the said caps, the blades of the wipers being arranged diagonally of the seed-dropping plate and in the path of the seed-receiving openings as the said seed-dropping plate is revolved, chambers formed at the under portion of the said ring-housing, and spring-controlled detents within the said chambers, which detents are arranged to enter the seed-dropping openings as the seed-dropping plate revolves, the wipers serving to remove excess of seed from the seed-carrying openings and the detent serving to prevent the seed-dropping plate from turning in a reverse direction, as set forth.

6. In a seed-planter the combination with a base-plate having a seed-opening, a ring-housing attached to the base-plate and having extensions at its periphery, and a chamber in its under face, and a seed-dropping plate having a plurality of seed-openings and arranged between the base-plate and housing, of a cap on each of the extensions of the housings, pivoted wipers carried by the housings beneath the caps and having their blades extending downwardly and diagonally of the seed-plate, and a pivoted and spring-pressed discharge-arm in the chamber of the housing, as set forth.

7. In a seed-planter, the combination with a seed-plate having a plurality of seed-openings, each adapted to receive a single seed, and means for operating said seed-plate, of mechanism for controlling the operation of the seed-plate-operating means to temporarily stop the said seed-plate to permit more or less seed to be delivered to a hill, as set forth.

8. In a seed-planter, the combination with a revoluble seed-plate having a plurality of seed-openings, each adapted to receive a single seed, and pawls for engaging the seed-plate to revolve the same, of a device adapted to be moved between the seed-plate and one of the pawls to prevent the pawl from operating the seed-plate, as set forth.

9. In a seed-planter, the combination with a revoluble seed-plate having a plurality of seed-openings, each adapted to receive a single grain, and an opening at the side of each seed-opening, and pawls for engaging the said openings to revolve the plate, the said pawls engaging a different opening, of a plate fitted to slide on the seed-plate over the openings at the side of the seed-openings, and means for controlling the movement of said plate, as set forth.

In testimony whereof I have signed my name to this specification in the presence of two subscribing witnesses.

JOHN ALBERT ANDERSON.

Witnesses:
C. L. NELSON,
A. L. JOHNSON.